US009802659B2

(12) United States Patent
Anderson

(10) Patent No.: US 9,802,659 B2
(45) Date of Patent: Oct. 31, 2017

(54) SPARE TIRE CARRIER FUEL TANK

(71) Applicant: Klint S. Anderson, Rigby, ID (US)

(72) Inventor: Klint S. Anderson, Rigby, ID (US)

( * ) Notice: Subject to any disclaimer, the term of this patent is extended or adjusted under 35 U.S.C. 154(b) by 0 days.

(21) Appl. No.: 14/815,663

(22) Filed: Jul. 31, 2015

(65) Prior Publication Data

US 2017/0029045 A1 Feb. 2, 2017

(51) Int. Cl.
*B62D 43/02* (2006.01)

(52) U.S. Cl.
CPC .................................. *B62D 43/02* (2013.01)

(58) Field of Classification Search
CPC ............................. B62D 43/02; B62D 43/045
USPC .................. 224/42.13, 42.12, 42.165, 42.24
See application file for complete search history.

(56) References Cited

U.S. PATENT DOCUMENTS

| 1,421,050 | A |   | 6/1922 | Washington |  |
|---|---|---|---|---|---|
| 2,043,872 | A | * | 6/1936 | Wise | F16B 41/005 |
|   |   |   |   |   | 70/232 |
| 3,658,201 | A | * | 4/1972 | Williams | B60R 9/06 |
|   |   |   |   |   | 224/42.13 |
| 4,498,614 | A |   | 2/1985 | Guarr |  |
| 4,993,610 | A |   | 2/1991 | Abretske et al. |  |
| 5,118,017 | A |   | 6/1992 | Buck |  |
| 5,203,479 | A |   | 4/1993 | Lucas |  |
| 5,429,285 | A | * | 7/1995 | Kim | B62D 43/10 |
|   |   |   |   |   | 206/373 |
| 5,806,736 | A | * | 9/1998 | Kincart | B60R 9/06 |
|   |   |   |   |   | 224/42.13 |
| D399,122 | S | * | 10/1998 | Princell | D8/339 |
| 6,910,669 | B2 | * | 6/2005 | Gates | B62D 43/02 |
|   |   |   |   |   | 224/42.13 |
| 8,690,033 | B2 |   | 4/2014 | Harriton |  |
| 8,955,725 | B2 |   | 2/2015 | Turner |  |
| 9,174,528 | B2 | * | 11/2015 | Anderson | B60K 15/03177 |
| 2008/0067200 | A1 | * | 3/2008 | Bernshtein | B60R 9/06 |
|   |   |   |   |   | 224/42.13 |

(Continued)

FOREIGN PATENT DOCUMENTS

| CN | ZL201230018621.4 | 1/2012 |
|---|---|---|
| WO | 2014026137 | 4/2014 |

OTHER PUBLICATIONS

Web page download, Fuel Caddy, American Expedition Vehicles product listing: https://secure.aev-conversions.com/shop/fuel-caddy, 1 page, Accessed on Mar. 14, 2017.

*Primary Examiner* — Brian D Nash
(74) *Attorney, Agent, or Firm* — Schmeiser, Olsen & Watts LLP

(57) ABSTRACT

A spare tire carrier fuel tank is configured to be located between the spare tire carrier and the spare tire on a vehicle that has its spare tire mounted at a location on the upper, rear, exterior of the vehicle body. The spare tire carrier fuel tank may include a tank body having a main reservoir and a wheel reservoir. At least one structural reinforcement recess may be formed in the tank body. Multiple indentations may also be formed in the tank body in order to accommodate a variety of spare tire carriers. A mounting system may include a first mounting plate coupled to a face of the tank body and also coupled to a spare tire carrier. A second mounting plate is coupled to the first mounting plate and to a spare tire so that the tank is located between the spare tire carrier and the spare tire.

19 Claims, 14 Drawing Sheets

(56) References Cited

U.S. PATENT DOCUMENTS

2015/0102038 A1\* 4/2015 Anderson .............. B60K 15/06
 220/562
2016/0052387 A1 2/2016 Anderson et al.
2016/0101720 A1 4/2016 Anderson et al.

\* cited by examiner

SPARE TIRE CARRIER FUEL TANK

BACKGROUND OF THE INVENTION

1. Technical Field

This invention relates to a fuel tank which fits between the spare tire carrier and the spare tire on vehicles with a spare tire carrier mounted on the upper rear, exterior of a vehicle.

2. Background Art

All vehicles have a limited capacity fuel tank. For basic everyday driving, the limited capacity of the fuel tank is not normally an issue. There are many situations, however, where the limited capacity of a vehicle's fuel tank may become an issue. For example, vehicles used for off-roading such as Jeeps®, and the like, may travel long distances between gas stations. Drivers of these vehicles have to be very careful that they do not run out of fuel in remote locations.

In order to protect themselves from running out of fuel when a gas station is not readily available, drivers of vehicles used for off-roading will often pack extra fuel tanks in the storage area, back seat or other locations in the vehicle. These tanks, however, take up space that could be used for passengers, camping equipment or the like. Additionally, these tanks must be secured in place in order to prevent them from falling over and potentially spilling in the vehicle.

In order to eliminate the problem of spare fuel tanks taking up all of the space in the vehicle, inventors have designed spare fuel tanks which are mounted at locations on the outside of the vehicle. A few of these types of spare fuel tanks are illustrated in Abretske et al., U.S. Pat. No. 4,993,610 (hereinafter "Abretske"), Harriton, U.S. Pat. No. 8,690,033 (hereinafter "Harriton"), Turner, U.S. Pat. No. 8,955,725 (hereinafter "Turner"), and Washington, U.S. Pat. No. 1,421,050 (hereinafter "Washington"). Abretske illustrates a storage container such as fuel cans which are mounted between the spare tire mount and the vehicle. Harriton illustrates a fuel tank which is located between the spare tire mount and the spare tire. Harriton, however, requires a specific spare tire carrier. Turner illustrates a storage tank for liquids such as fuel which is mounted to the back of a spare tire on a vehicle such as a Jeep®. Washington has a reservoir for fuel which is arcuate in shape and which is strapped to the spare tire along the top/back of the tire.

None of these references, however, disclose a spare fuel tank which can be mounted on a variety of spare tire carriers between the spare tire carrier and the spare tire. Harriton specifically requires a special aftermarket spare tire carrier in order for the tank disclosed to mount between the spare tire carrier and the spare tire.

Accordingly, what is needed is a durable spare fuel tank which mounts on a variety of spare tire carriers between the spare tire carrier and the spare tire on vehicles with exteriorly mounted spare tires such as Jeeps® and the like.

DISCLOSURE OF THE INVENTION

The spare tire carrier fuel tank, as disclosed hereafter in this application, allows a spare fuel tank to be carried between a spare tire carrier and a spare tire on vehicles such as Jeeps®. Additionally, the spare tire carrier fuel tank maximizes the amount of fuel that can be stored in this space while allowing the tank to be used with a variety of standard and aftermarket spare tire carriers.

In particular embodiments, a spare tire carrier fuel tank, configured for mounting between a spare tire carrier and a spare tire, includes a tank body having a main reservoir and a wheel reservoir. A fuel neck may be coupled to the tank body. At least one structural reinforcement recess may also be formed in the tank body. A mounting system may be used for coupling the tank body to the spare tire carrier.

An alternate embodiment of a spare tire carrier fuel tank, configured for mounting between a spare tire carrier and a spare tire, may include a tank reservoir wherein the tank reservoir has a wheel reservoir and a main reservoir in fluid communication. The tank reservoir includes a proximal side and a distal side. A fill neck may be in fluid communication with the tank reservoir. Multiple indentations may be formed in the proximal side of the tank reservoir, wherein the multiple indentations are configured to accommodate a variety of spare tire carriers. A first mounting plate may be coupled to the proximal side of the tank reservoir and to the spare tire carrier. A second mounting plate may be coupled to the first mounting plate on the distal side of the tank reservoir and to the spare tire.

Additional embodiments of a spare tire carrier fuel tank, configured for mounting on a spare tire carrier, may include a tank body having a wheel portion and a main portion, wherein the wheel portion is configured to fit within the confines of a wheel of a spare tire. A fill neck may be in fluid communication with the tank body. At least one mounting plate may be coupled to the tank body and a plurality of mounting holes may be formed in the at least one mounting plate for coupling the at least one mounting plate to a variety of spare tire carriers.

The foregoing and other features and advantages of the spare tire carrier fuel tank will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and.

DESCRIPTION OF THE INVENTION

Figure 1:
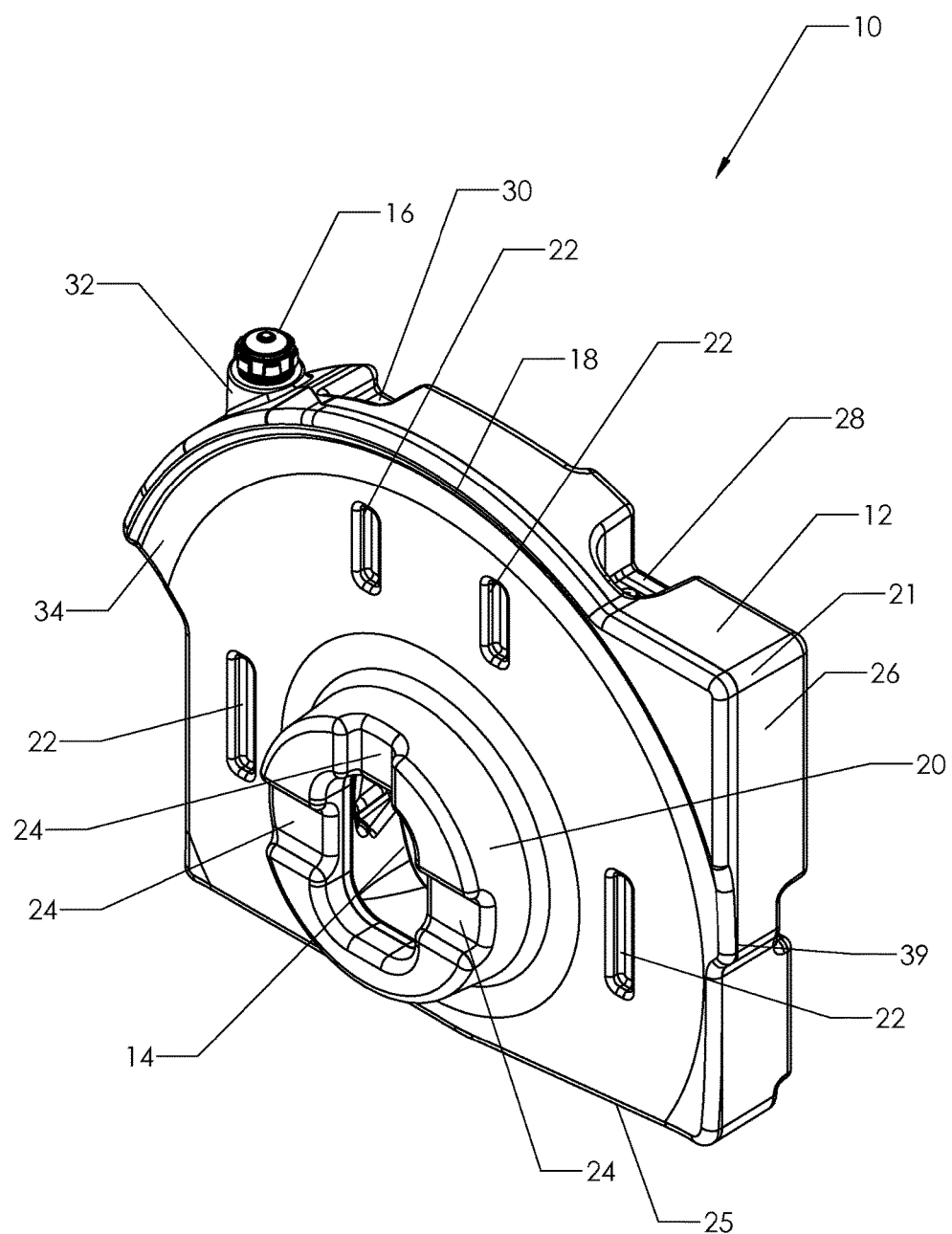
FIG. 1 is an isometric view of a spare tire carrier fuel tank.
Figure 2:
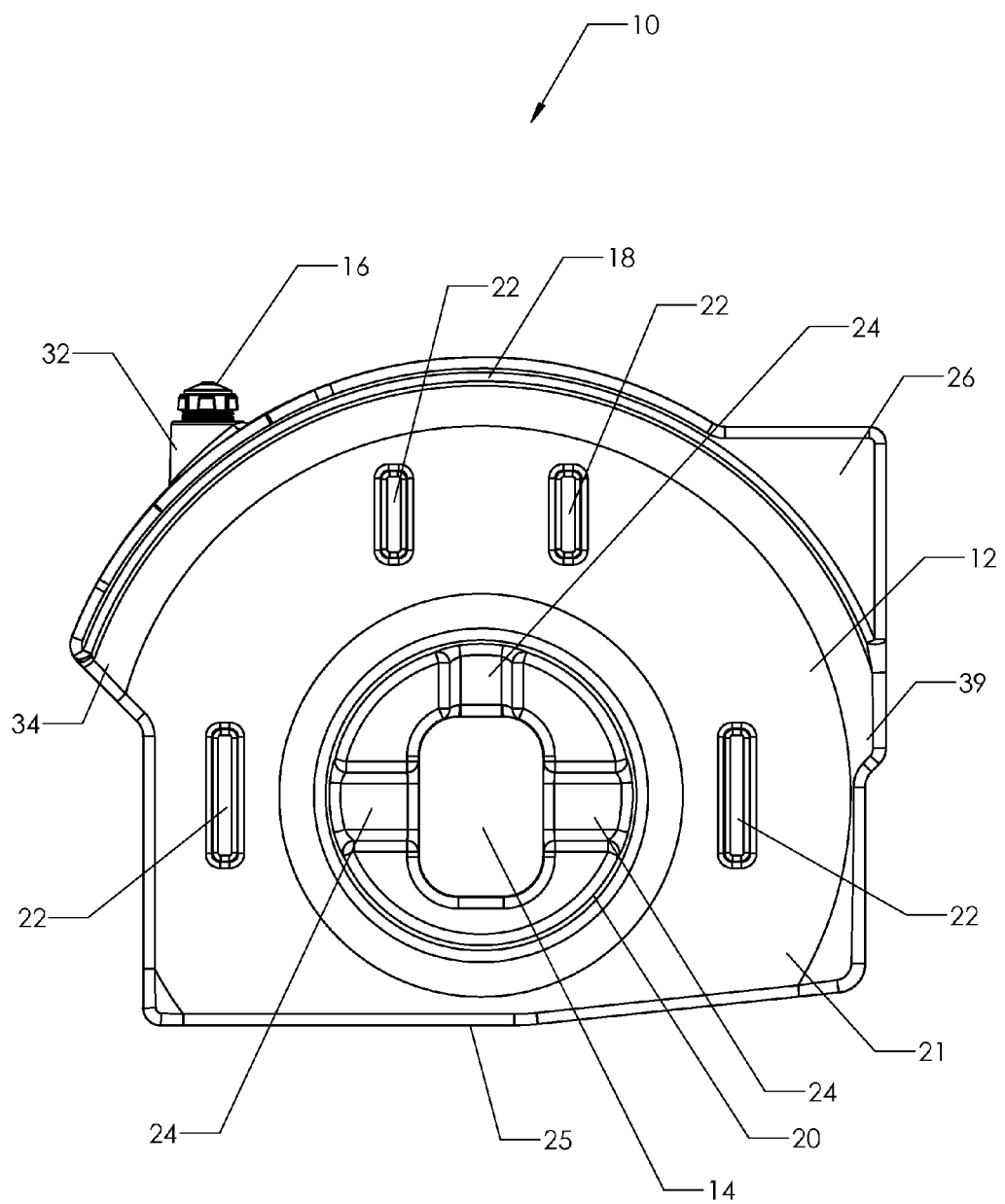
FIG. 2 is a front view of a spare tire carrier fuel tank.

As discussed above, embodiments of the present invention relate to a fuel storage tank that is mounted between the spare tire carrier and the spare tire on vehicles, such as Jeeps®, which carry the spare tire on the rear tailgate or in a location on the body of the vehicle instead of underneath the vehicle.

FIGS. 1-7 illustrate a spare tire carrier fuel tank 10 without a mounting device or system. The spare tire carrier fuel tank 10 as illustrated includes a tank body 12. The tank body 12 is a hollow fluid tight reservoir in which fuel is stored. The tank body 12 can be any shape desired which fits in the space between the spare tire carrier and the spare tire. It is desirable, however, to maximize the amount of fuel that can be stored in the tank body 12. Therefore, a tank that is large and fills most of the available space is desirable.

As illustrated, the tank body 12 consists of a main reservoir 21 and a wheel reservoir 20 which are in fluid communication with one another. The main reservoir 21 is the largest of the two reservoirs. The main reservoir 21 fills the space between the spare tire and the spare tire carrier.

The main reservoir 21 may be any shape desired. The main reservoir 21, however, is illustrated as having a contoured top 18 which simulates the contour of the spare tire. This contoured top 18 prevents the main reservoir 21 from extending too far above the spare tire and impeding the view in the rear view mirror of the vehicle.

The main reservoir 21 is also illustrated as having overhang 34 on one edge. This overhang 34 is located at one end of the contoured top 18 of the main reservoir 21. The contoured top 18 extends partway down the side of the main reservoir 21. Then at the location of the overhang 34, the side of the main reservoir 21 is indented significantly. Causing the main reservoir 21 to have less breadth under the overhang 34.

The overhang 34, and the indentation underneath it, prevent the main reservoir 21 from interfering with the functioning of the handle of the tailgate on the vehicle.

The side of the main reservoir 21 which is opposite from the overhang 34 may have an approximately 90 degree angle corner 26 on top. This square or rectangular corner 26 also helps to maximize the amount of fuel stored in the main reservoir 21. The corner 26 is lower on the main reservoir 21 than the highest location on the contoured top 18, thereby preventing the corner 26 from interfering with the visibility of the driver of the vehicle.

The side of the main reservoir 21 below the rectangular corner 26 may also have a ridge 39 formed in it. The ridge 39 is formed by the bottom corner of the main reservoir 21 being slightly indented from the top of the main reservoir 21. This indentation prevents the main reservoir 21 from interfering with the functioning of various spare tire carriers and the tailgates on certain types of vehicles.

The bottom 25 of the main reservoir 21 may be curved or, as illustrated, it may be a substantially flat surface.

The main reservoir 21 is in fluid communication with the wheel reservoir 20. The wheel reservoir 20 is cylindrical in shape with a mount opening 14 formed in the center of the wheel reservoir 20.

The wheel reservoir 20 is also hollow in order to hold fuel inside the wheel reservoir 20 itself. The wheel reservoir 20 is shaped so that it fits inside the rim of a spare tire wheel. Therefore, when the tank 10 is in place on a vehicle, the wheel reservoir 20 is placed so that it fits within the confines of the wheel itself.

The main reservoir 21 and the wheel reservoir 20 which form the tank body 12 may be formed from any metallic or non-metallic material desired. The tank body 12 is the portion of the spare tire carrier fuel tank 10 that contains the fuel. The tank body 12 may be formed from any material which does not react with the fuel contained in it. The tank body 12 could also be lined with a material other than the one used to form the tank body 12 itself. The preferred materials for the tank body 12 are likely those that can be easily formed through processes such as rotational molding or the like. By using rotational molding to form the tank body 12, a seamless tank body 12 may be created which has increased strength. The materials will also need to withstand the abuse that will occur as the vehicle is in motion. The tank body 12 may also be exposed to sunlight and the elements for extended periods of time. Therefore the materials used to form the tank body 12 will need to withstand sunlight and the elements without degrading. One material, which has the characteristics desired, is high density cross-linked polyethylene.

High density cross-linked polyethylene can withstand heat and cold. It is also very resistant to chemicals and has high impact strength.

A mount opening 14 is formed in the center of the wheel reservoir 20. The mount opening 14 is a substantially rectangular pass through which allows access from the wheel reservoir 20 through the main reservoir 21. The mount opening 14 may be formed as any shape desired. The mount opening 14 should, however, pass completely through the tank body 12. The mount opening 14 is part of the mounting system for the tank 10.

Additionally, at least one access channel 24 may be formed in the wheel reservoir 20. The at least one access channel 24 allows the user to access locations in the tank body 12 or the mounting system. The user may need to access these locations with hardware such as couplers, screws, bolts or the like. The user may also need to access these locations with tools.

The figures illustrate three access channels 24 formed in the surface of the wheel reservoir 20. In practice, however, more access channels 24 may be formed in the surface of the wheel reservoir 20 or in other locations on the tank body 12. Fewer access channels 24 may also be used.

The access channels 24 are shown as rectangular indentations with a uniform depth in the surface of the wheel reservoir 20. The access channels 24, however, may be formed in any length, width, depth or shape desired. I.e. the access channels 24 may have varying depths depending on the type of tool which the user will need access for. The access channels 24 may be any size or shape necessary for them to serve their function.

Strengthening indentations 22 may also be formed in the tank body 12. The strengthening indentations 22 provide strength to the tank body 12. The strengthening indentations 22 shown on the front or distal side of the tank body 12, which is the side of the tank body 12 which faces away from the vehicle, are elongated rectangles in shape. These strengthening indentations 22 are depressed areas on the tank body 12.

The strengthening indentations 22, though illustrated as rectangles, may be formed in any size or shape desired so long as the size and shape add strength to the tank body 12 while not removing too much of the tank body's 12 volume.

A fuel fill neck 32 may also be coupled to or formed in the main reservoir 21 of the tank body 12. The fuel fill neck 32 is used to put fuel into the tank body 12 and to remove fuel from the tank body 12. The fuel fill neck 32, as illustrated, is a hollow cylindrical opening in the tank body 12 which allows access to the interior of the hollow tank body 12.

The fuel fill neck 32, though shown at the top of the tank body 12, may also be placed in any location desired on the tank body 12, provided the fuel fill neck 32 does not interfere with the use of the tank 10, the tailgate of the vehicle, the spare tire, the spare tire carrier or the like.

The fuel fill neck 32 is closed with a fuel cap 16. The fuel cap 16 as illustrated is a standard fuel cap 16. The fuel cap 16, however, can be any type of fuel cap 16 desired.

In alternate embodiments, the fuel cap 16 may have a tether which couples it to the tank body 12 so that the fuel cap 16 cannot fall or get lost when the fuel fill neck 32 is open.

Fuel cap holder 30 is formed in the proximal side of the top 18 of the main reservoir 21. The proximal side of the tank 10 is the side closest to the vehicle when the tank 10 is in use. The fuel cap holder 30 is a depression or indentation in the top of the tank body 12 for placing the fuel cap 16 in when the fuel cap 16 is not coupled to the fuel fill neck 32. The fuel cap holder 30 provides the user with a safe location to place the fuel cap 16 so that it does not fall or get lost when the tank 10 is being filled or fuel is being removed from the tank 10.

An additional indentation in the top of the tank body 12 is the grounding rod cutout 28. The grounding rod cutout 28 is a depression or indentation in the top of the tank body 12 which provides a location for the grounding rod 42 to be placed into the tank body 12.

The grounding rod cutout 28 and the fuel cap holder 30 are illustrated as square indentations in the top of the tank body 12. The grounding rod cutout 28 and the fuel cap holder 30, however, may be formed in any size, shape, or location desired provided they still serve their intended purposes.

In alternate embodiments, the fuel cap holder 30 may be shaped so that the fuel cap 16 may be secured into the fuel cap holder 30. The user would push the fuel cap 16 into the fuel cap holder 30 and then apply pressure to the fuel cap 16 to push the fuel cap 16 out of the fuel cap holder 30.

A grounding rod or wire 42 is contained in the grounding rod cutout 28. Due to the material which the tank body 12 may be made of, it is important to make sure that all static electricity or other electricity is grounded somewhere safe in order to prevent the fuel in the tank from being ignited. The grounding rod 42 is coupled to the tank body 12 at an opening located in the grounding rod cutout 28. The grounding rod 42 then extends to the bottom of the tank body 12.

Figure 3:
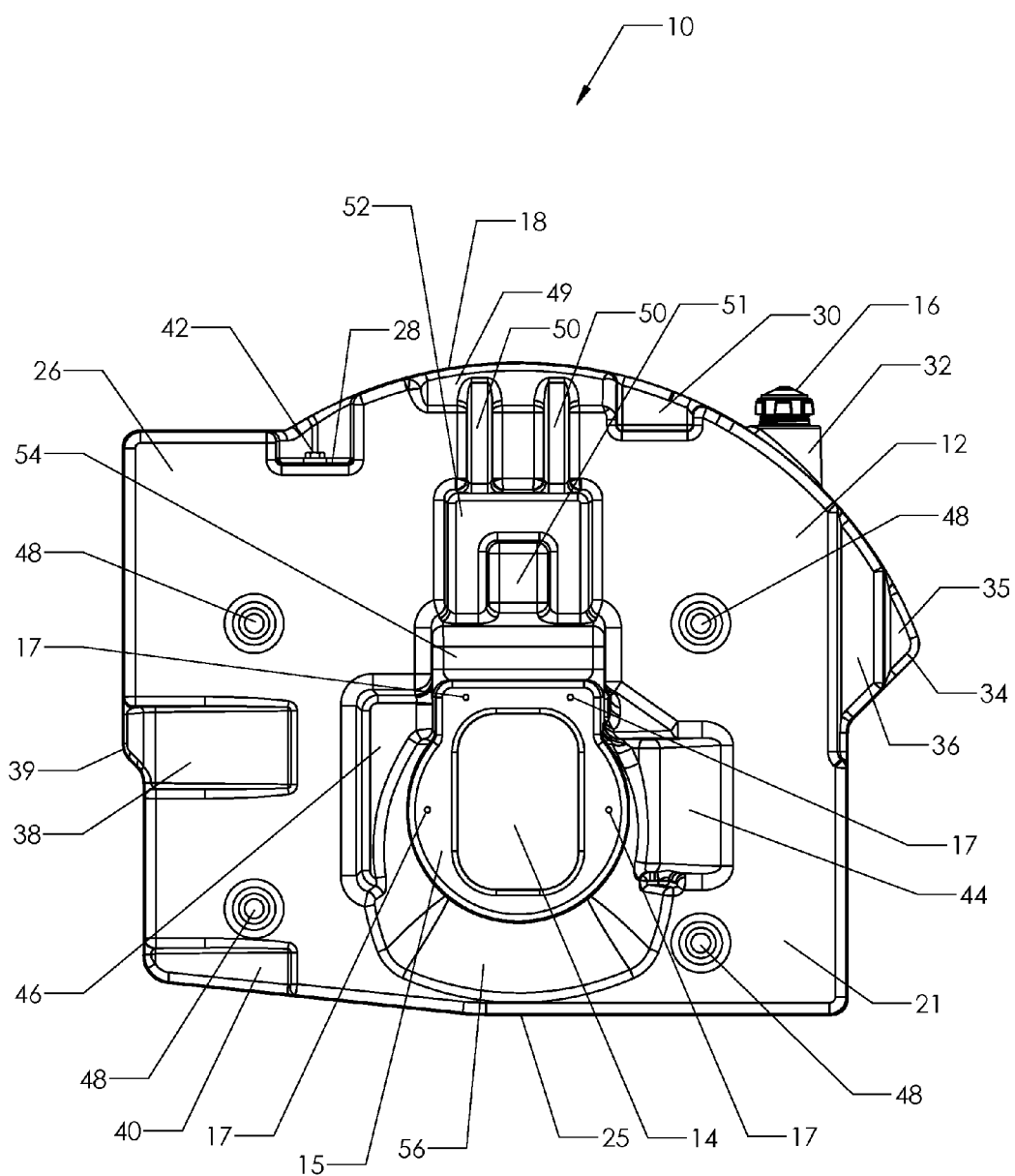
FIG. 3 is a back view of a spare tire carrier fuel tank.
Figure 4:
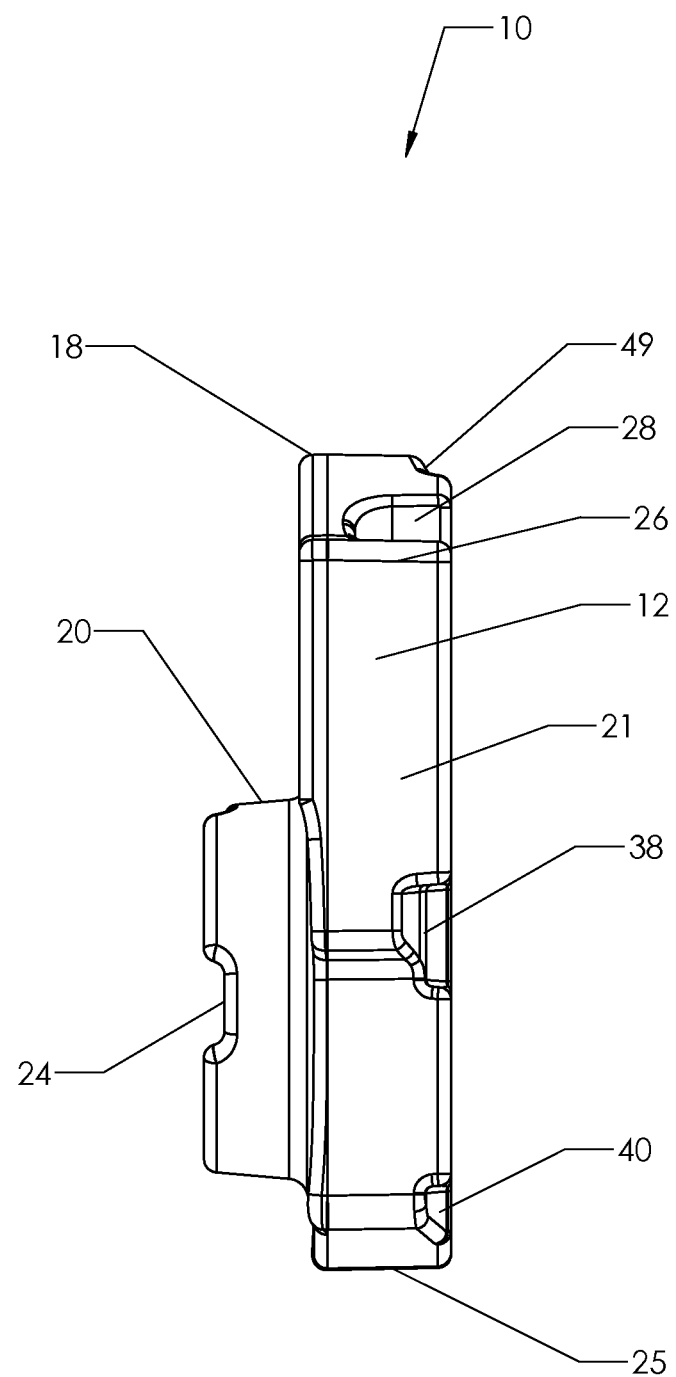
FIG. 4 is a first side view of a spare tire carrier fuel tank.
Figure 5:
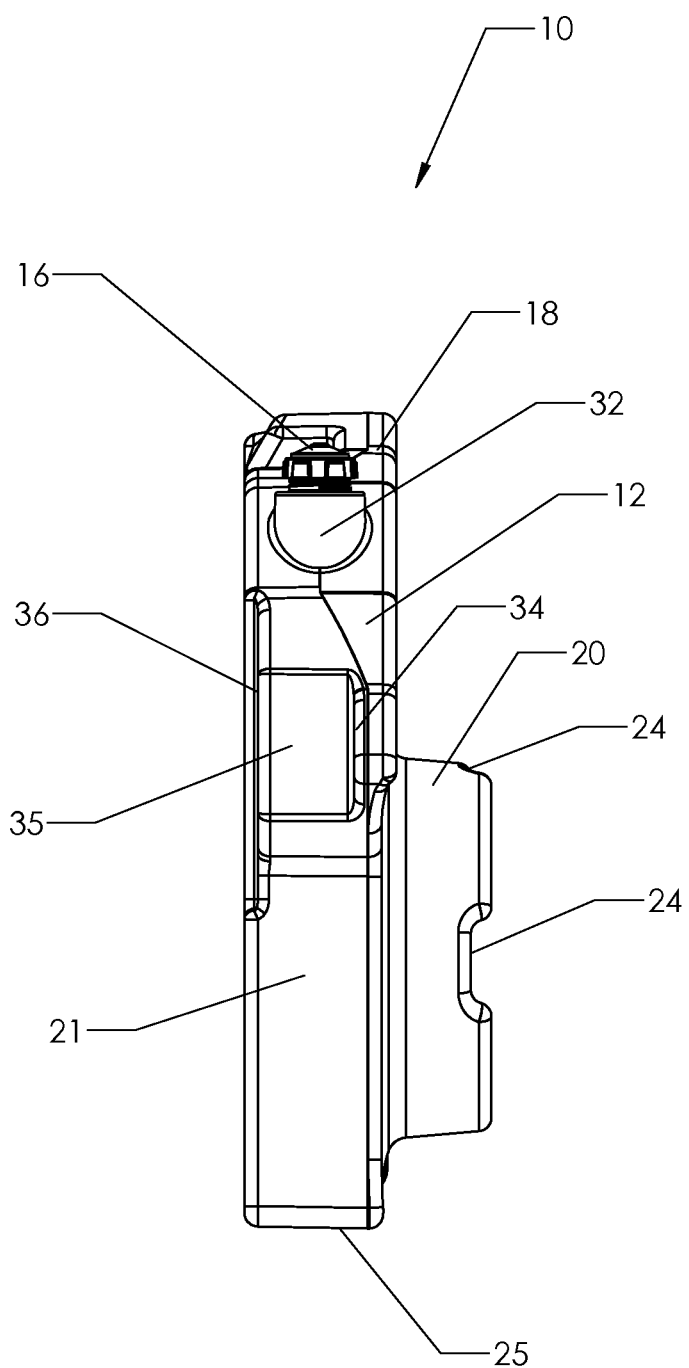
FIG. 5 is a second side view of a spare tire carrier fuel tank.
Figure 6:
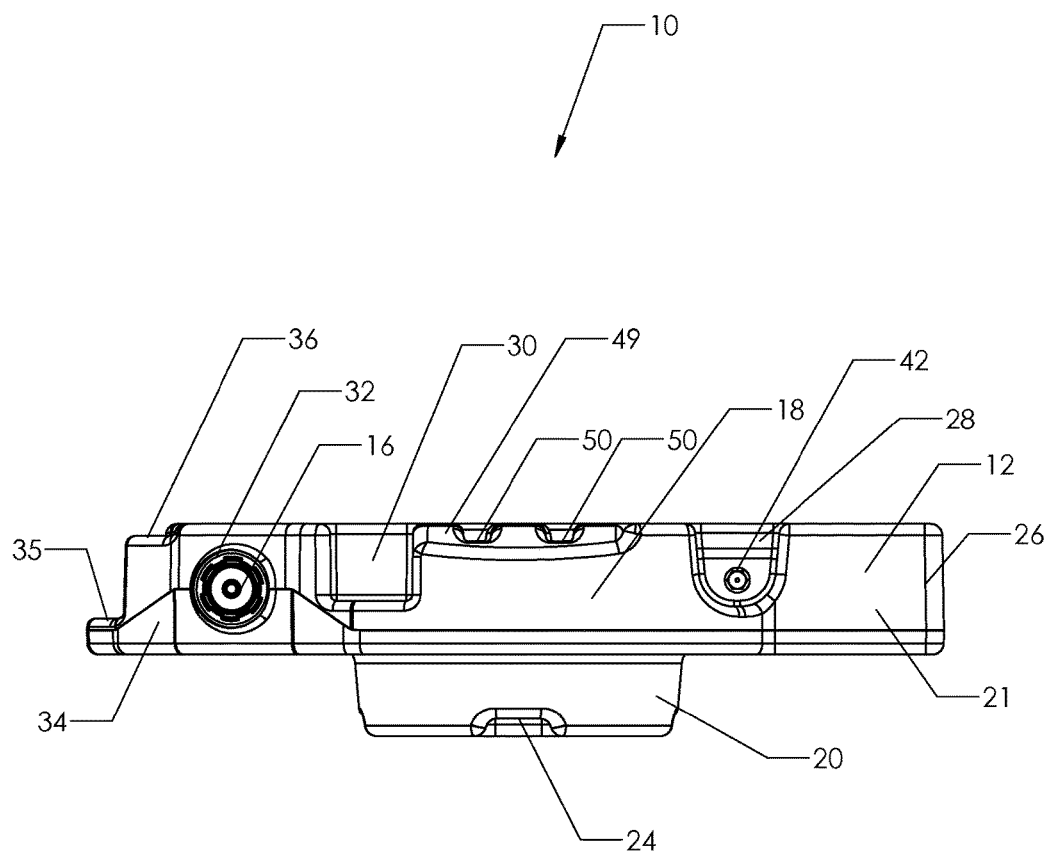
FIG. 6 is a top view of a spare tire carrier fuel tank.
Figure 7:
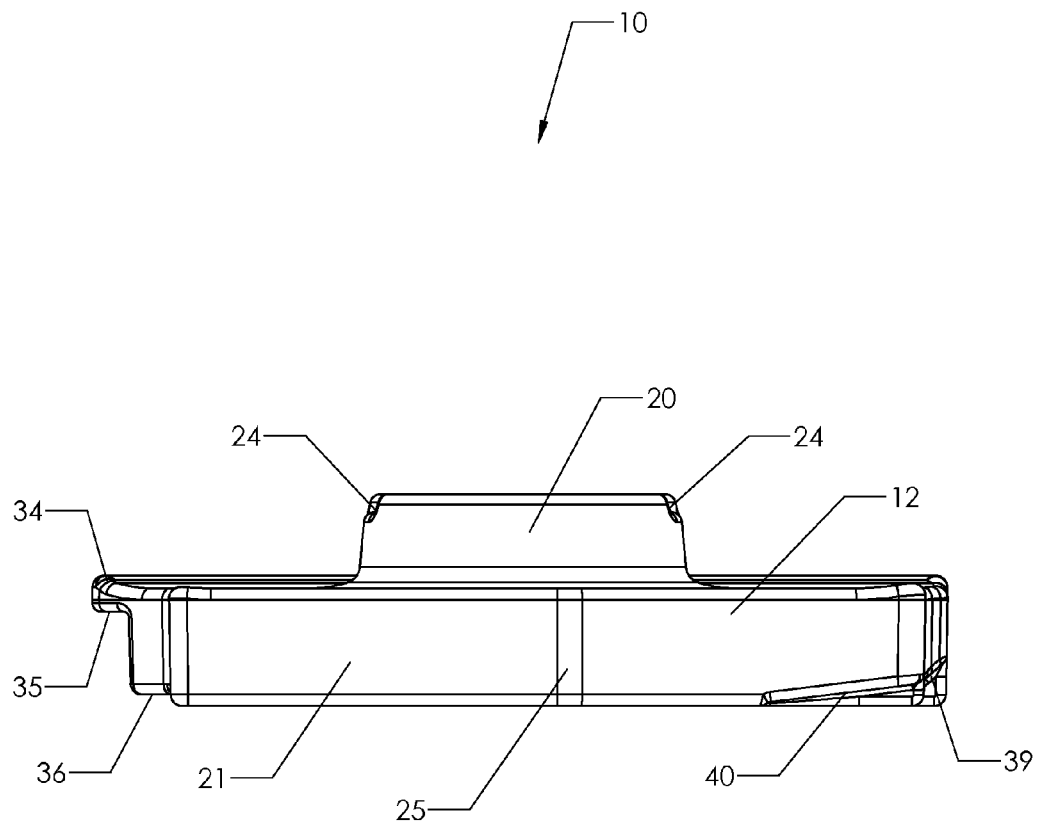
FIG. 7 is a bottom view of a spare tire carrier fuel tank.
Figure 8:
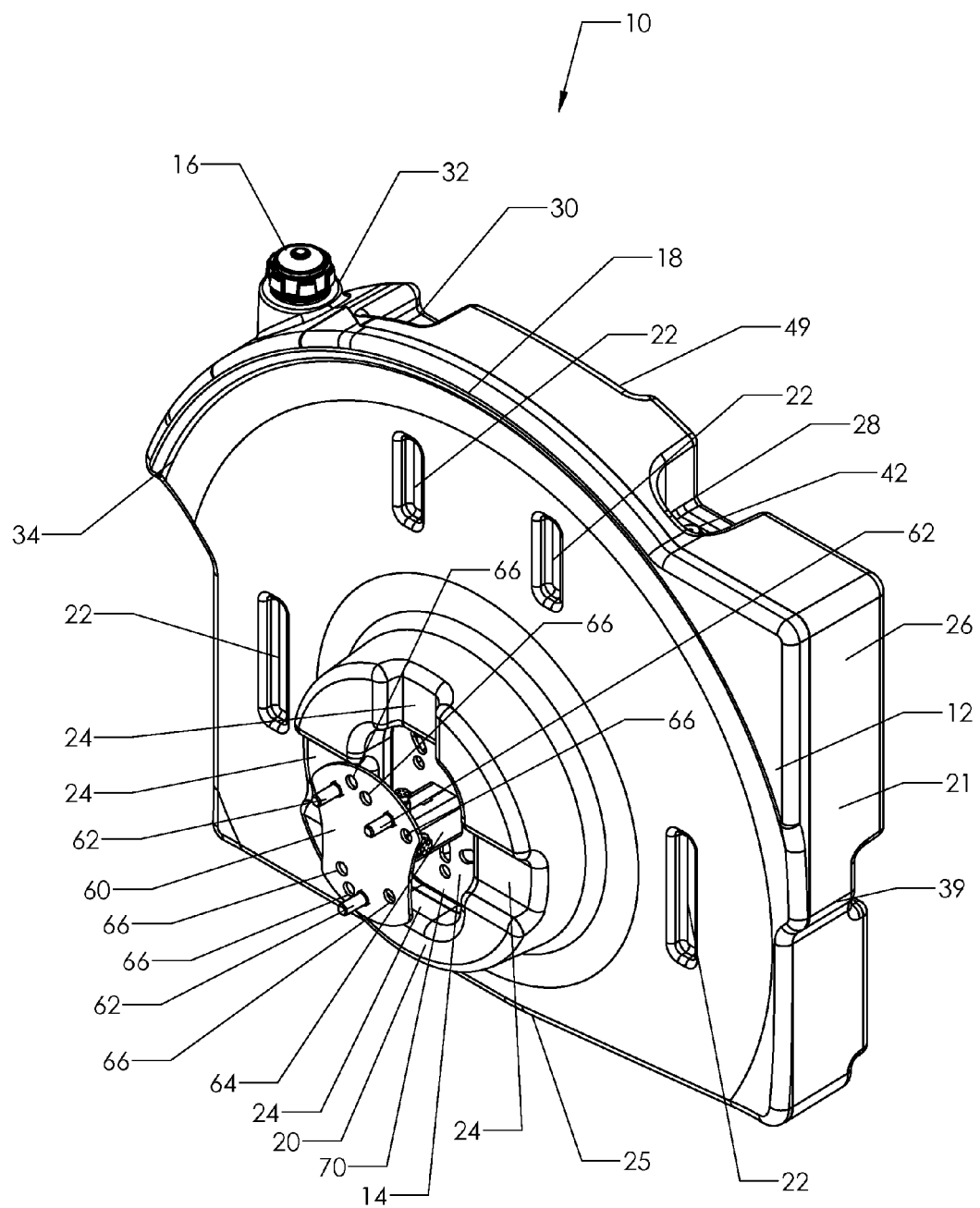
FIG. 8 is an isometric view of a spare tire carrier fuel tank with mounting system.

The proximal, rear or back side of the tank body 12 may have many different indentations, cutouts and depressions formed in it (See FIG. 3).

Third brake light indentations 49, 51 and 52 are all recesses in the tank body 12 surface which accommodate various components of a third brake light on a vehicle. Additionally, these third brake light indentations 49, 51 and 52 may accommodate different components from third brake lights on various makes and models of vehicles, thereby allowing the tank body 12 to be used on different makes and models of vehicles with different third brake light locations.

Third brake light indentations 49, 51 and 52 may also be any shape desired and may be placed in any location desired on the tank body 12, provided the third brake light indentations 49, 51 and 52 allow space for all of the required components of the third brake light on the vehicle.

Fewer or more third brake light indentations 49, 51 and 52 may be formed in the tank body 12 depending upon the need of the vehicles which the tanks 10 are going to be mounted on.

The proximal side of the tank body 12 also has additional strengthening indentations 48. Strengthening indentations 48 may be, as illustrated, conical depressions or recesses in the surface of the main reservoir 21 of the tank body 12. These strengthening indentations 48 pass through the entire depth of the tank body 12 and abut the distal surface of the main reservoir 21 of the tank body 12. The strengthening indentations 48 add strength to the tank body 12 and aid in preventing the tank 10 from being crushed if the vehicle is hit from behind.

Though illustrated as conical indentations, the strengthening indentations 48 may be any size or shape desired so long as they increase the strength of the tank body 12. The strengthening indentations 48 may be cylindrical, rectangular or the like.

The figures illustrate four strengthening indentations 48, though fewer or more strengthening indentations 48 may be formed in the tank body 12 surface.

First overhang cutout 35 is an indentation formed in the proximal surface of the tank body 12 at the end of the overhang 34. The first overhang cutout 35 may serve many purposes, including creating clearance for vehicle or spare tire carrier features. Additionally, the first overhang cutout 35 may simply be used for decorative purposes such as allowing a label to be placed in an inconspicuous location.

First overhang cutout 35 may be any size, shape, or depth desired.

Second overhang cutout 36 may also provide clearance for features on a vehicle or spare tire carrier. Second overhang cutout 36 may not be as deep as first overhang cutout 35, thereby creating a stair step effect on the overhang 34. The second overhang cutout 36 may, also, be any size, shape or depth desired.

Additional indentations, recesses and depressions on the proximal side of the tank body 12 may include tire carrier clearance indentations 44, 46, 54 and 56. These indentations are all formed in order to allow clearance for various parts on a variety of spare tire carriers. These spare tire carriers include standard or factory spare tire carriers as well as many different types of aftermarket spare tire carriers.

While the tire carrier clearance indentations 44, 46, 54 and 56 allow for the clearance of many different types and styles of spare tire carriers, these indentations as shown in the figures are merely illustrative. Additional tire carrier clearance indentations 44, 46, 54 and 56 may also be included in order to allow the tank 10 to be used with even more styles and types of spare tire carriers.

It is likely preferable to have a variety of tire carrier clearance indentations 44, 46, 54 and 56 so that the tank 10 may be versatile enough to be used with the majority of spare tire carriers on the markets.

The tire carrier clearance indentations 44, 46, 54, and 56 allow users to install the tank 10 on their vehicles without having to buy expensive aftermarket spare tire carriers. The location and shape of the tire carrier clearance indentations 44, 46, 54 and 56 may change as the style of spare tire carriers change.

The tire carrier clearance indentations 44 in particular are designed to allow a swinging joint on a few particular brands of spare tire carriers to function properly without the tank 10 interfering with its movements.

First hinge cutout 38 and second hinge cutout 40 are indentations or recesses formed in the proximal surface of the tank body 12 along one edge of the main reservoir 21. The first hinge cutout 38 and the second hinge cutout 40 allow for clearance of the tailgate hinges on many Jeeps®.

While cutouts such as the first hinge cutout 38 and the second hinge cutout 40 may be ideally located as illustrated in the figures for Jeeps® and other off-roading type vehicles, the location of cutouts such as the first hinge cutout 38 and the second hinge cutout 40 may change as the style and design of the vehicles change.

Clearance channels 50 are two rectangular shaped channels formed in the proximal side of the tank body 12. The clearance channels 50 allow for clearance of bolt heads which are part of the third brake light assembly on several vehicles.

While two clearance channels 50 are illustrated, more or fewer channels may be used as needed. Additionally, the clearance channels 50 may be any size, shape, depth, width or length desired.

FIG. 3 also illustrates a mounting plate receiving surface 15. The mounting plate receiving surface 15 is a flat portion of the tank body 12 which is configured to couple to a mounting plate with the mounting plate being positioned adjacent the mounting plate receiving surface 15.

The mounting plate receiving surface 15 may be any size or shape desired. The mounting plate receiving surface 15 in the figures is illustrated as having a circular portion with a rectangular top forming a light bulb type shape.

The mounting plate receiving surface 15 may have mounting plate coupler holes 17 formed in it. The mounting plate coupler holes 17 receive couplers that hook the mounting plate to the mounting plate receiving surface 15.

The mounting plate coupler holes 17 may simply be holes that screws or bolts are twisted into. Alternate embodiments include holes which a threaded sleeve are inserted into and then the screws, bolts or other couplers are screwed into the threaded sleeve. Additional embodiments include a nut placed in the mounting plate coupler holes 17. The nut allows a screw, bolt or other coupler to be screwed into the nut while the nut is retained in the mounting plate coupler holes 17.

Figure 9:
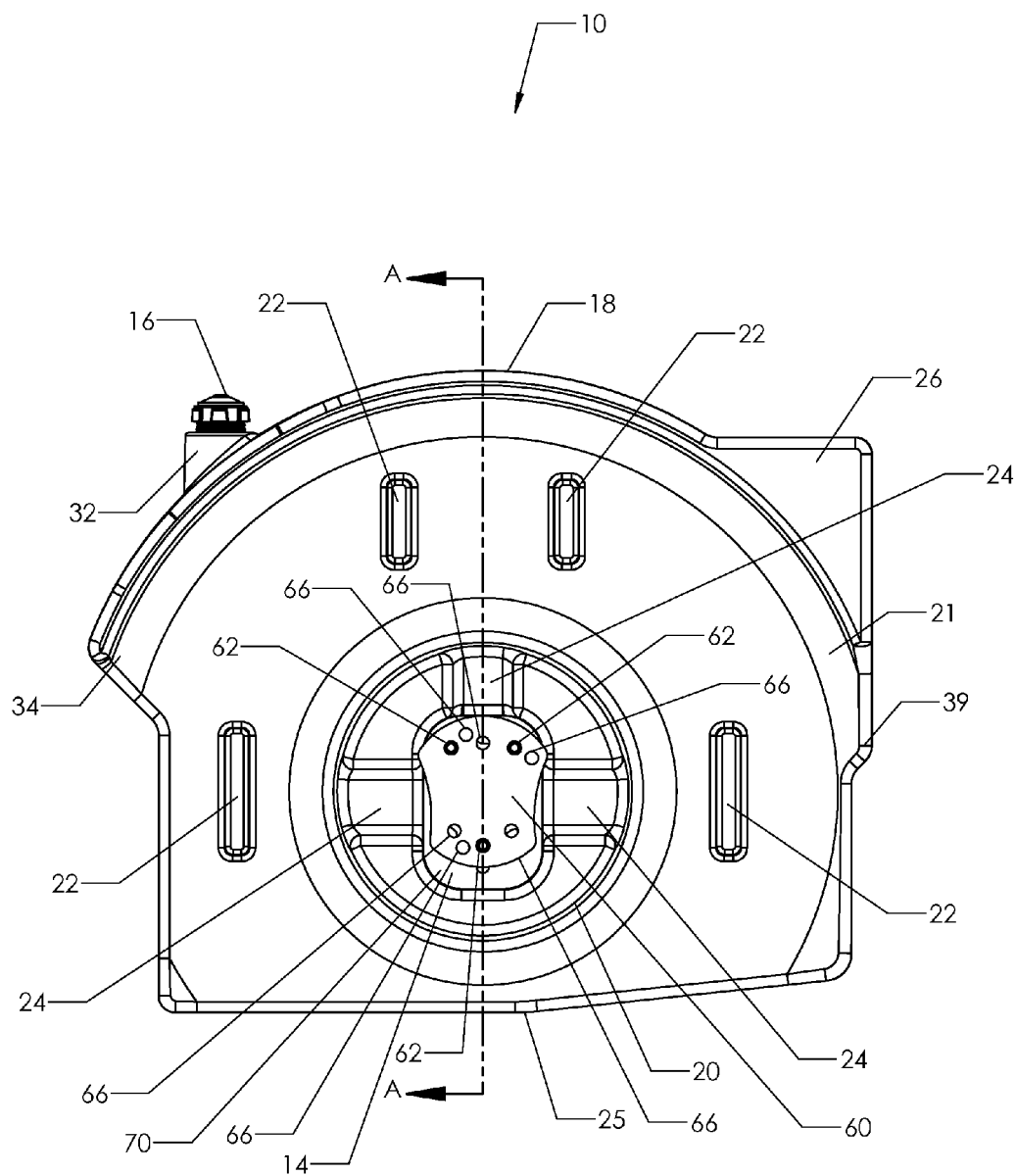
FIG. 9 is a front view of a spare tire carrier fuel tank with mounting system.
Figure 10:
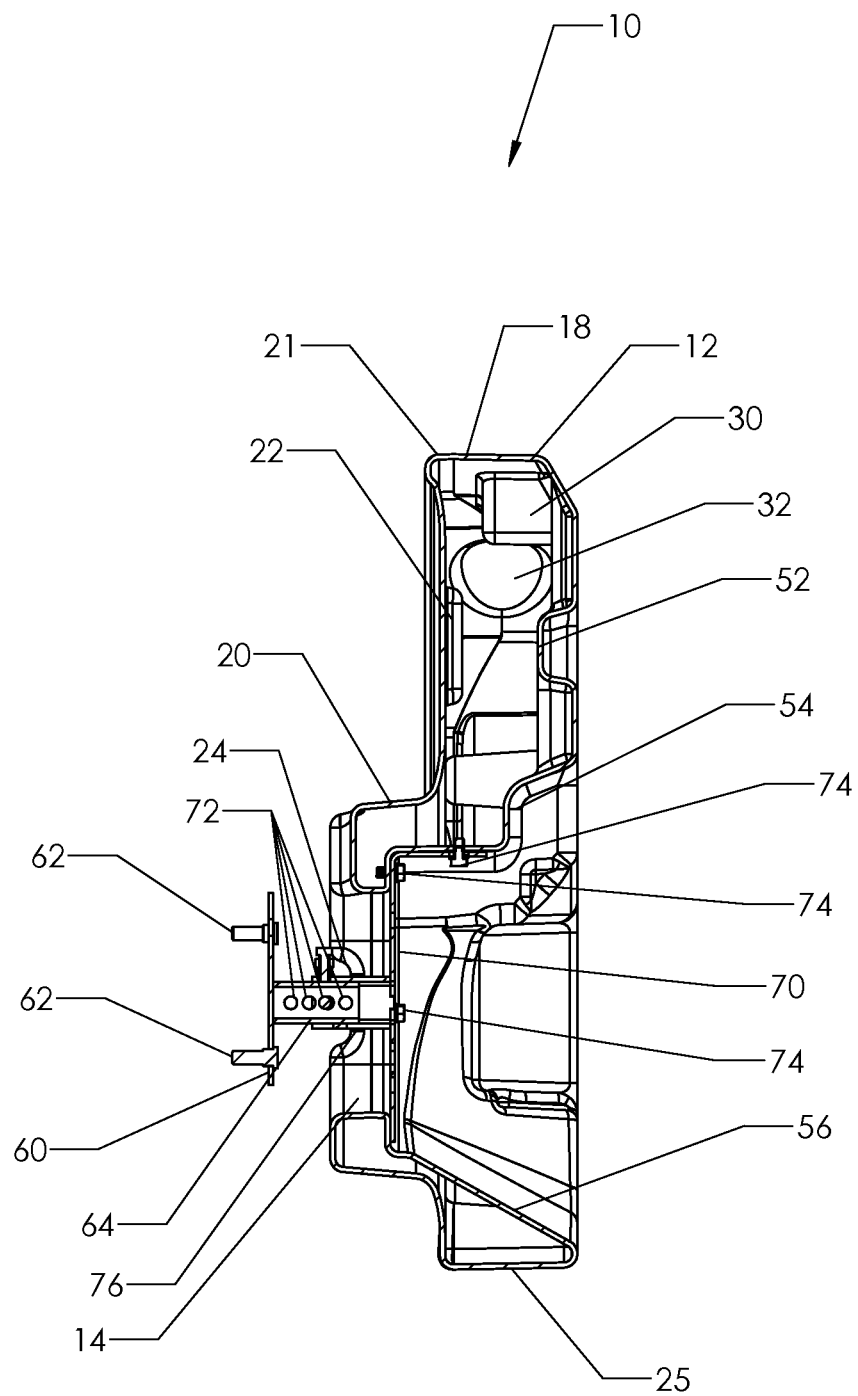
FIG. 10 is a cross-sectional view of a spare tire carrier fuel tank with mounting system taken along line A-A of FIG. 9.
Figure 11:
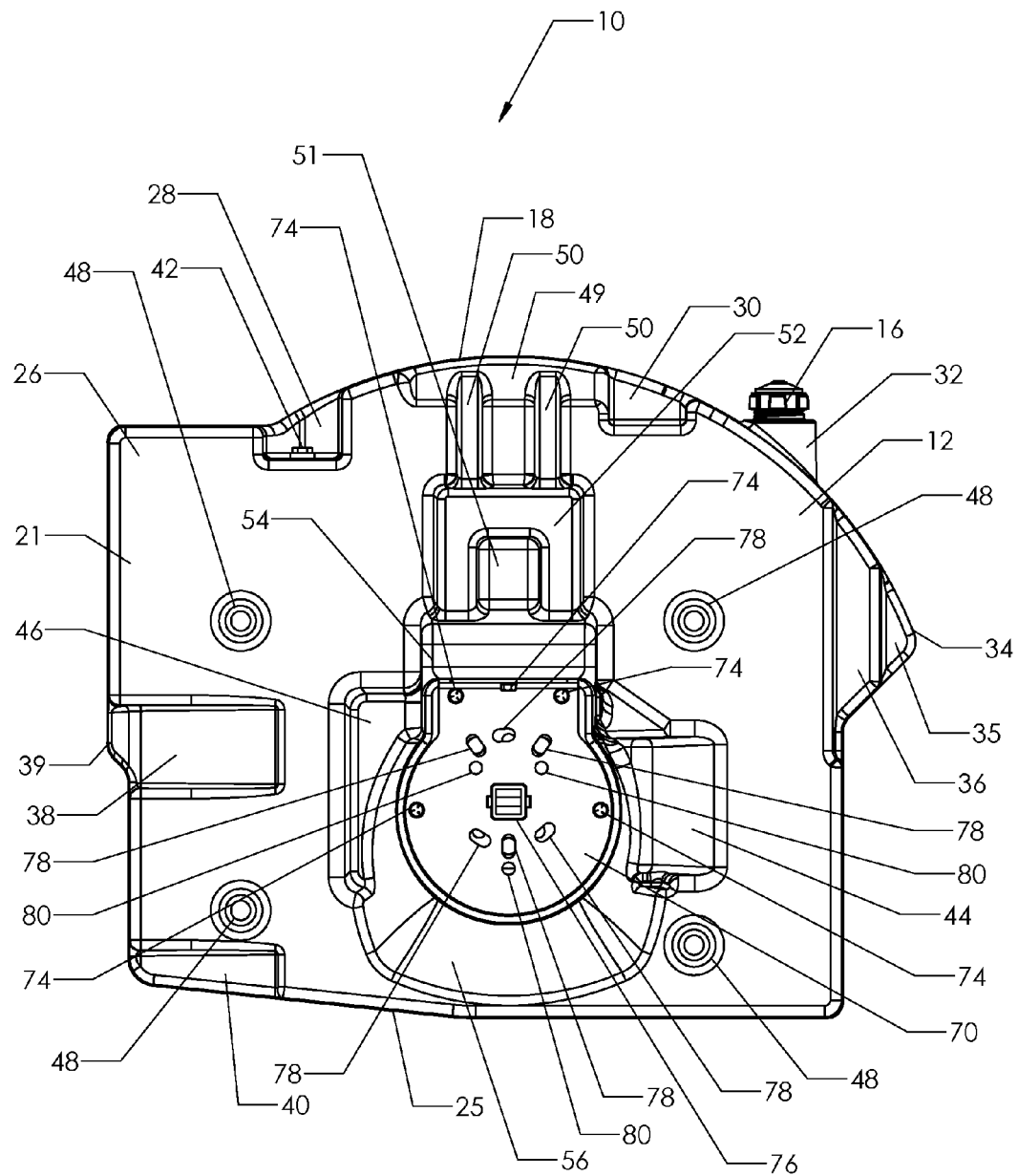
FIG. 11 is a back view of a spare tire carrier fuel tank with mounting system.
Figure 12:
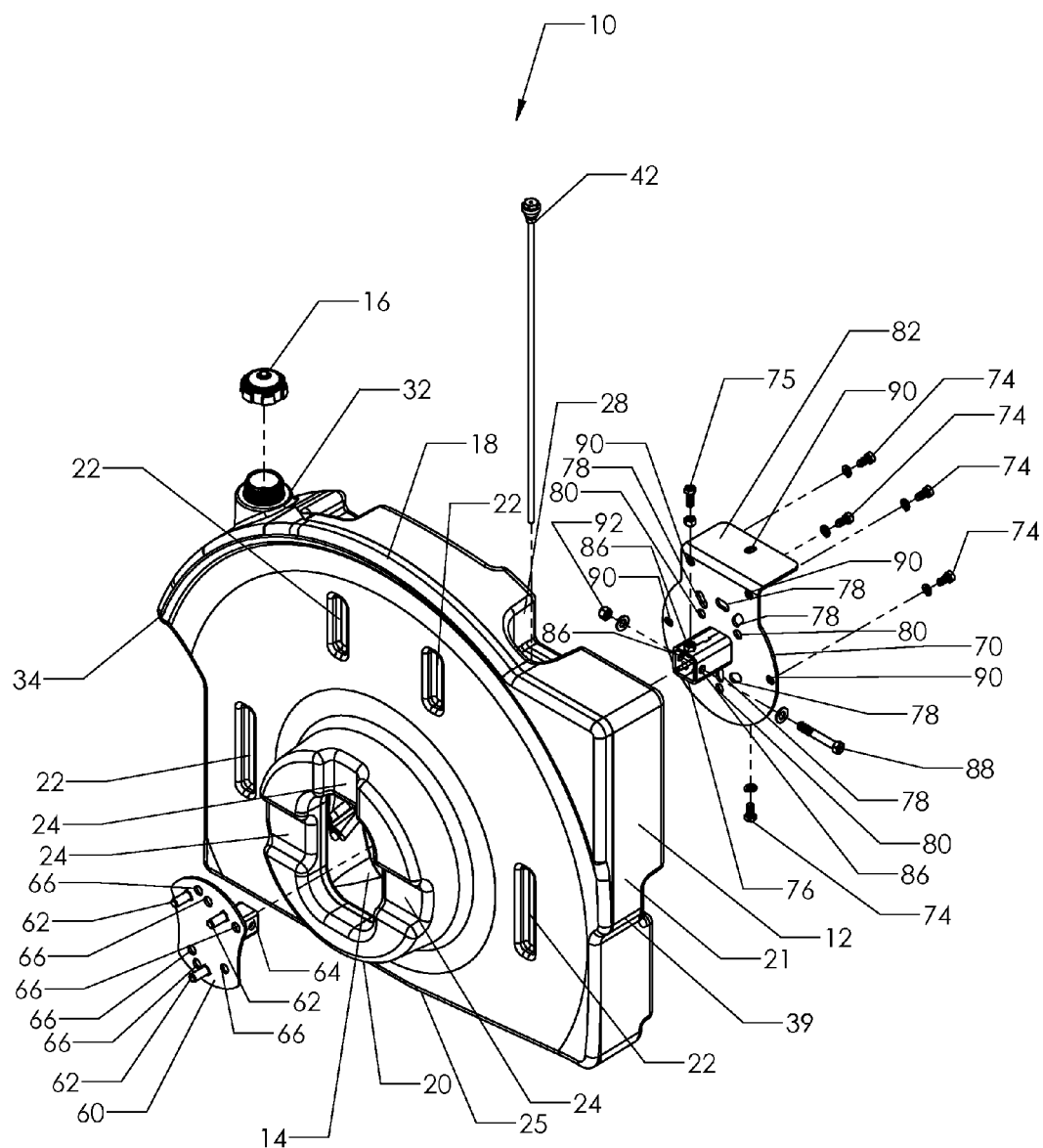
FIG. 12 is an exploded isometric view of a spare tire carrier fuel tank with mounting system.

FIGS. 8-12 illustrate a tank body 12 with a mounting system coupled to it. The mounting system includes a proximal mounting plate 70 (as illustrated in FIGS. 11 and 12). Proximal mounting plate 70 includes a plate formed in a shape similar to the shape of the mounting plate receiving surface 15. The plate has a round section with a rectangular section near the top of the plate, giving the plate the appearance of an upside down light bulb. The proximal mounting plate 70 has an additional upper section 82 which is a rectangular plate coupled to the light bulb shaped portion of the proximal mounting plate 70 at an approximately ninety degree or right angle.

The proximal mounting plate 70 may be formed in any size or shape desired, provided the proximal mounting plate 70 is sized to couple with both the tank body 12 and the spare tire carrier. The proximal mounting plate 70 may be formed from a variety of materials including, but not limited to, plastic, wood, metal, fiberglass, composites, polymers and the like.

The mounting post sleeve 76 is coupled to the surface of the proximal mounting plate 70 towards the center of the round portion of the upside down light bulb shaped plate. The mounting post sleeve 76 is a section of a hollow square or rectangular tube which is coupled perpendicular to the surface of the proximal mounting plate 70. The mounting post sleeve 76 is coupled to the opposite side of the light bulb shaped plate as the upper section 82 is coupled to.

The mounting post sleeve 76 is illustrated as a hollow square rectangular tube, however, it may be formed in any size or shape that is able to receive an additional member, i.e. a square member may be placed in the rectangular tube. Alternatively, the mounting post sleeve 76 may be received by another member.

The mounting post sleeve 76 may be formed from any material desired, such as wood, metal, plastic, polymer, fiberglass, composites or the like.

The mounting post sleeve 76 has at least one sleeve hole 86 formed in its surface. The at least one sleeve hole 86 may be configured to receive a coupler such as a pin, bolt, screw, nail or the like. Two at least one sleeve holes 86 may be formed in opposite surfaces of the mounting post sleeve 76 so that a coupler may pass through the entire width of the mounting post sleeve 76.

An additional sleeve hole 86 may be formed in the top of the mounting post sleeve 76. This sleeve hole 86 may be threaded or coupled to a bolt in order to receive a coupler or set screw.

The proximal mounting plate 70 is coupled to the mounting plate receiving surface 15. The proximal mounting plate 70 is coupled to the mounting plate receiving surface 15 with proximal mounting plate couplers 74. These proximal mounting plate couplers 74 may be bolts, screws, adhesive, epoxy or the like. The proximal mounting plate couplers 74 illustrated in the figures are bolts with washers, though they could be replaced by any type of coupler desired.

The proximal mounting plate couplers 74 are inserted through proximal mounting plate coupler openings 90 formed in the proximal mounting plate 70. Proximal mounting plate coupler openings 90 are holes formed in the proximal mounting plate 70, through which couplers such as bolts or screws may be inserted. Proximal mounting plate coupler openings 90 are located so as to align with the mounting plate coupler holes 17 discussed previously.

The proximal mounting plate couplers 74 are inserted through the proximal mounting plate coupler openings 90 in the proximal mounting plate 70. The proximal mounting plate couplers 74 are then inserted into the mounting plate coupler holes 17 which are formed in the tank body 12. Once the proximal mounting plate couplers 74 are tightened, the proximal mounting plate 70 is coupled adjacent the mounting plate receiving surface 15.

The proximal mounting plate 70 also has alternate bolt locations 78 and 80. The proximal mounting plate 70 is designed to couple to a variety of different types of spare tire carriers. Each type of spare tire carrier has a preexisting bolt arrangement that is used to secure the spare tire to the spare tire carrier. In order to use the preexisting bolt arrangement for a variety of different types of spare tire carriers, the proximal mounting plate 70 has several alternate bolt locations 78 and 80.

Alternate bolt locations 78 are slots so that the bolt may be located anywhere along the slot in the proximal mounting plate 70. This allows the proximal mounting plate 70 to be coupled to several spare tire carriers with similar bolt configurations.

Alternate bolt locations 80 are specifically designed for certain spare tire carriers that require that the tank 10 be coupled higher than on the majority of spare tire carriers. Therefore, alternate bolt locations 80 lift the tank 10 to a higher location.

Depending on the type of spare tire carrier that is already on a user car, the user can use the existing bolts in the existing locations on the spare tire carrier to couple the proximal mounting plate to the spare tire carrier.

After the bolts from the spare tire carrier have been inserted into alternate bolt locations 78 and 80, a nut is screwed onto the end of each of the spare tire carrier bolts. The nut is screwed onto the bolts through mount opening 14.

When the proximal mounting plate 70 is coupled to both the spare tire carrier and the tank body 12, the mounting post sleeve 76 is inserted in or through the mount opening 14 formed in the tank body 12.

On the other side of the tank 10, FIGS. 9, 10 and 12 illustrate the front or distal side of the spare tire carrier fuel tank 10. The distal side of the spare tire carrier fuel tank 10 is the side of the tank 10 farthest from the vehicle.

The distal mounting plate 60 is a thin plate formed in a mostly rectangular shape. The distal mounting plate 60, while mostly rectangular, has a wider top than bottom. Additionally, the side perpendicular edges of the distal mounting plate 60 have a slight inward curve, while the horizontal edges have a slight outward curve.

The distal mounting plate 60 may also be formed in any size or shape desired, i.e. square, circle, oval, trapezoid, parallelogram or the like. Additionally, the distal mounting plate 60 may be formed from any material desired, such as wood, metal, plastic, polymers, fiberglass, composites and the like, provided the material chosen is capable of withstanding the forces applied to the distal mounting plate 60.

The proximal face, or face closes to the vehicle, of the distal mounting plate 60 is coupled to a mounting post 64 as seen in FIG. 10. The mounting post 64 is typically coupled approximately perpendicular to the distal mounting plate 60 surface.

The mounting post 64 is illustrated as a member with a square cross-section. The mounting post 64 may have a solid cross-section or a hollow cross-section. Additionally, the mounting post 64 is smaller in width than the interior of the mounting post sleeve 76.

The mounting post 64 may also be formed in any shape or size desired. The mounting post 64 may also be formed from any material desired.

The mounting post 64 also has at least one mounting post hole 72. The mounting post holes 72 pass completely through the mounting post 64. Additionally, the mounting post holes 72 are of a shape and size similar to the sleeve holes 86 discussed previously.

In use, the mounting post 64 is inserted into the mounting post sleeve 76. The mounting post holes 72 are made to align with whichever sleeve holes 86 that are desired. A mounting coupler 88 is then inserted through a sleeve hole 86, at least one mounting post hole 72 and then through an additional sleeve hole 86.

The mounting coupler 88 may be any type of coupler desired. The mounting coupler 88 is illustrated as a bolt that passes through the mounting post sleeve 76 and the mounting post 64 and is then secured by the use of a coupler nut 92. While a bolt and nut are illustrated, the mounting post 64 and the mounting post sleeve 76 may be coupled together in any way desired such as welding, adhesive, epoxy, bolts, screws and the like.

An additional mounting post coupler or set screw 75 may be inserted into the sleeve hole 86 formed in the top of the mounting post sleeve 76. As discussed previously, the sleeve hole 86 formed in the top of the mounting post sleeve 76 may be threaded so that the set screw 75 may be screwed into the sleeve hole 86. By screwing the set screw 75 into the sleeve hole 86 located at the top of the mounting post sleeve 76, the mounting post 64 inside the mounting post sleeve 76 is forced securely towards the bottom of the mounting post sleeve 76. This biasing of the mounting post 64 within the mounting post sleeve 76 helps to reduce bouncing of the mounting post 64 within the mounting post sleeve 76 when the vehicle is in motion.

Alternate embodiments of the tank 10 may not include the additional set screw 75.

The distal face of the distal mounting plate 60 may have at least one wheel stud 62 extending from it as illustrated in FIGS. 9, 10 and 12. The at least one wheel stud 62 is a large bolt or coupler which extends through an opening in the distal mounting plate 60. The at least one wheel stud 62 is used to couple the spare tire to the spare tire carrier fuel tank 10. The at least one wheel stud 62 may be any type of stud or device desired, however, it is likely that standard wheel studs will be used.

The distal mounting plate 60 has alternate wheel stud locations 66. These additional openings in the distal mounting plate 60 allow the wheel studs to be moved to different areas of the distal mounting plate 60 in order to allow different types and sizes of spare tires to be coupled to the distal mounting plate 60. The alternate wheel stud locations 66 are multiple holes formed in the distal mounting plate 60, in which the wheel studs 62 may be placed.

Figure 13:
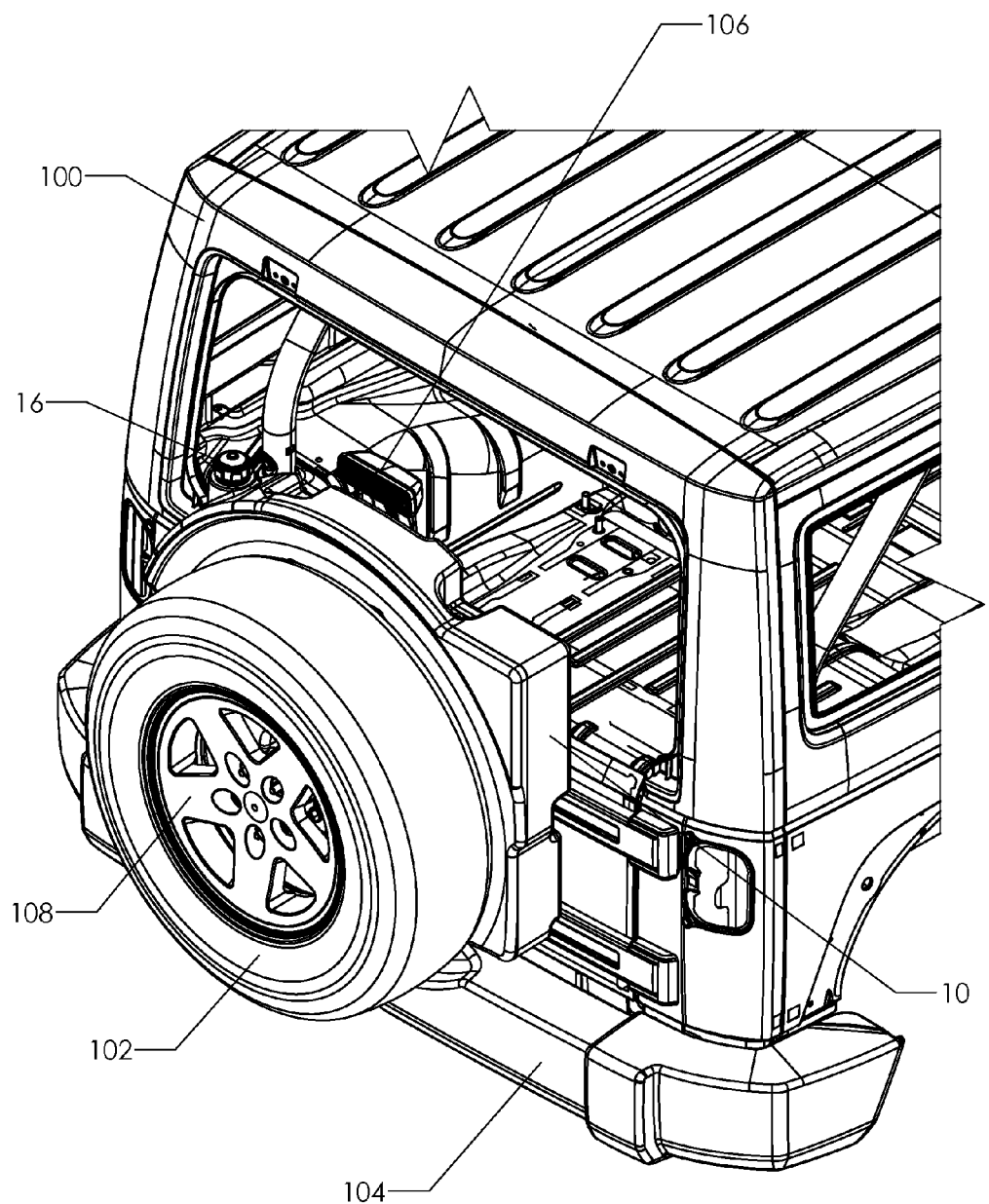
FIG. 13 is an isometric view of a spare tire carrier fuel tank mounted on the rear of a vehicle.
Figure 14:
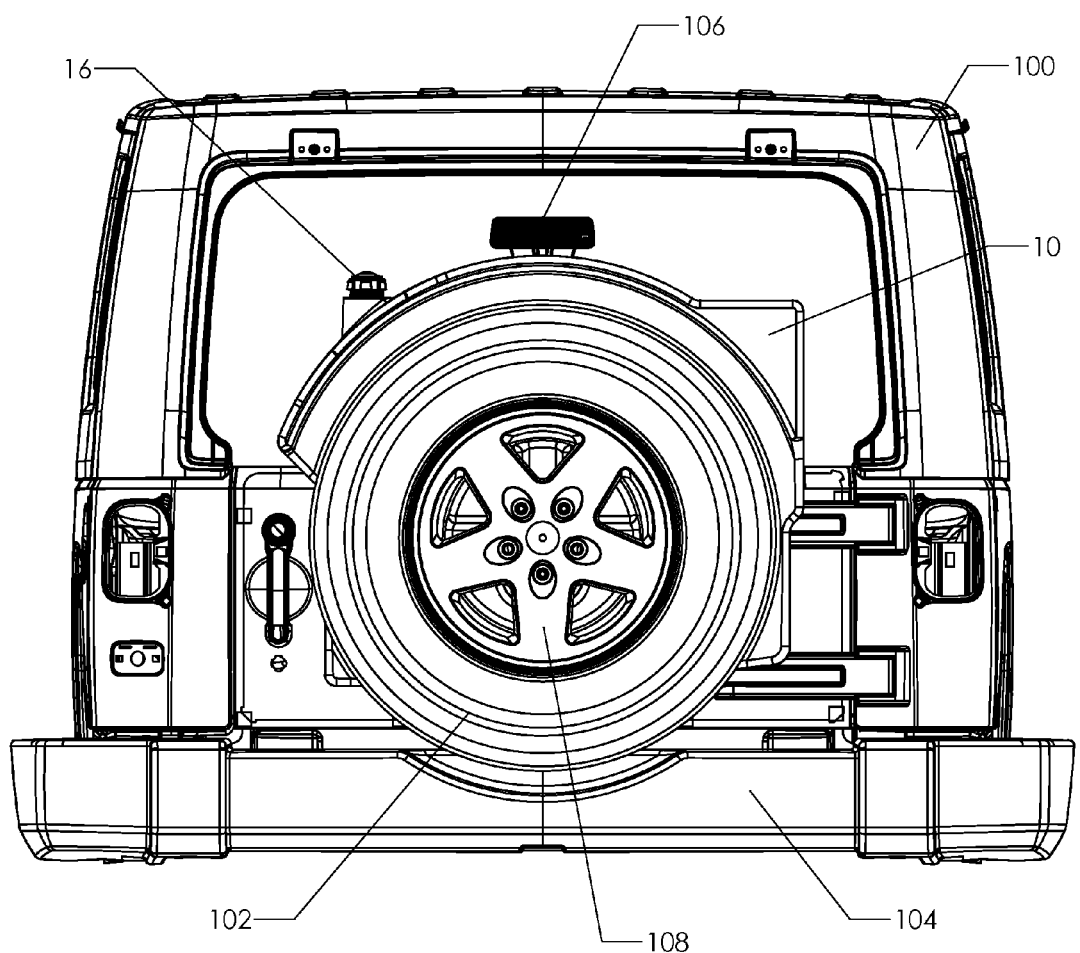
FIG. 14 is a front view of a spare tire carrier fuel tank mounted on the rear of a vehicle.

FIGS. 13 and 14 illustrate a spare tire carrier fuel tank 10 in use on a vehicle 100 with a third brake light 106, a bumper 104 and a spare tire 102. As seen in the figures, the spare tire carrier fuel tank 10 is mounted on the existing spare tire carrier. The spare tire 102 is then mounted on the distal surface of the spare tire carrier fuel tank 10. The spare tire carrier fuel tank 10 fills the area between the spare tire carrier and the spare tire 102. Additionally, the spare tire carrier fuel tank 10 also fills the space inside the wheel 108 of the spare tire 102. The wheel 108 is the center part of the spare tire 102 which is often formed from metal.

The spare tire carrier fuel tank 10 also allows the third brake light 106 to remain functional.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A spare tire carrier fuel tank, configured for mounting between a spare tire carrier and a spare tire, comprising:
   a tank body comprising a main reservoir and a wheel reservoir;
   a fuel neck coupled to said tank body;
   a plurality of structural reinforcement recesses formed in said tank body, wherein the plurality of structural reinforcement recesses pass through substantially an entire depth of the tank body and abut a surface of the main reservoir without extending through the entire said tank body;
   a mount opening formed through said main reservoir and said wheel reservoir;
   a mounting system for coupling said tank body to said spare tire carrier, and to couple the spare tire to the tank body; and
   wherein said mounting system is received through said mount opening.

2. The fuel tank of claim 1, wherein said mounting system further comprises a first mounting plate for mounting said tank body to said spare tire carrier.

3. The fuel tank of claim 1, wherein said mounting system further comprises a second mounting plate for mounting said tire adjacent said tank body.

4. The fuel tank of claim 1, further comprising a grounding rod coupled to said tank body.

5. The fuel tank of claim 1, wherein said tank body further comprises a distal surface and a proximal surface; wherein said proximal surface of said tank body is located adjacent said spare tire carrier and said distal surface of said tank body is located adjacent said spare tire; and wherein said fuel tank further comprises at least one tool access channel in said distal surface of said wheel reservoir of said tank body.

6. The fuel tank of claim 1, further comprising at least one third brake light indentation.

7. The fuel tank of claim 1, further comprising multiple indentations configured to accommodate a variety of tire carriers.

8. The fuel tank of claim 1, wherein said tank body is formed from high density cross-linked polyethylene.

9. A spare tire carrier fuel tank, configured for mounting between a spare tire carrier and a spare tire, comprising:
   a tank reservoir wherein said tank reservoir comprises a wheel reservoir and main reservoir in fluid communication;
   said tank reservoir comprising a proximal side and a distal side;
   a fill neck in fluid communication with said tank reservoir;
   multiple indentations formed in said proximal side of said tank reservoir, wherein said multiple indentations are configured to accommodate a variety of said spare tire carriers;
   a mount opening formed through said main reservoir and said wheel reservoir;
   a first mounting plate coupled to said proximal side of said tank reservoir and to said spare tire carrier;
   a second mounting plate coupled to said first mounting plate on said distal side of said tank reservoir and to said spare tire;
   wherein said second mounting plate is coupled to said first mounting plate through said mounting opening;
   a plurality of tool access channels in said distal surface of said wheel reservoir of said tank reservoir; and
   at least one structural reinforcement recess formed in said tank body, wherein the at least one structural reinforcement recess passes through substantially an entire depth of the tank body and abuts a surface of the main reservoir without extending through the entire said tank body.

10. The fuel tank of claim 9, further comprising a plurality of additional structural reinforcement recesses are formed in said distal side of said tank reservoir.

11. The fuel tank of claim 9, wherein the at least one structural reinforcement recess is formed in said proximal side of said tank reservoir.

12. The fuel tank of claim 9, further comprising a grounding rod coupled inside said tank reservoir.

13. The fuel tank of claim 9, further comprising at least one indentation configured to accommodate a vehicle's third brake light.

14. A spare tire carrier fuel tank, configured for mounting on a spare tire carrier, comprising:
   a tank body further comprising a wheel portion and a main portion;
   wherein said tank body further comprises a distal side and a proximal side;
   wherein said wheel portion is configured to fit within the confines of a wheel of a spare tire;
   a fill neck in fluid communication with said tank body;
   a mount opening formed through said wheel portion and said main portion of said tank body;
   at least one mounting plate coupled to said tank body;
   a plurality of mounting holes formed in said at least one mounting plate for coupling said at least one mounting plate to a variety of said spare tire carriers;
   a plurality of structural reinforcement recesses formed in said proximal side of said tank body, wherein the plurality of structural reinforcement recesses pass through substantially an entire depth of the tank body and abut a surface of the main reservoir without extending through the entire said tank body; and
   a plurality of additional structural reinforcement recesses formed in said distal side of said tank body.

15. The fuel tank of claim 14, further comprising a grounding rod coupled to said tank body.

16. The fuel tank of claim 14, wherein said tank body further comprises a plurality of indentations formed in said proximal side of said tank body configured to accommodate a variety of spare tire carriers.

17. The fuel tank of claim 14, further comprising at least one third brake light indentation formed in at a top, proximal edge of said tank body.

18. The fuel tank of claim 14, further comprising a fuel cap holder formed in said tank body.

19. The fuel tank of claim 14, wherein said at least one mounting plate is coupled to at least one second mounting plate and wherein a spare tire is coupled to said at least one second mounting plate.

* * * * *